United States Patent
Barsness et al.

(10) Patent No.: US 8,214,814 B2
(45) Date of Patent: *Jul. 3, 2012

(54) SHARING COMPILER OPTIMIZATIONS IN A MULTI-NODE SYSTEM

(75) Inventors: Eric L. Barsness, Pine Island, MN (US); David L. Darrington, Rochester, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 975 days.

This patent is subject to a terminal disclaimer.

(21) Appl. No.: 12/144,763

(22) Filed: Jun. 24, 2008

(65) Prior Publication Data

US 2009/0320008 A1    Dec. 24, 2009

(51) Int. Cl.
*G06F 9/45* (2006.01)

(52) U.S. Cl. ........ 717/151; 717/140; 717/144; 717/149; 709/100

(58) Field of Classification Search ............... 717/148, 717/149, 155, 156; 709/100
See application file for complete search history.

(56) References Cited

U.S. PATENT DOCUMENTS

| | | | | |
|---|---|---|---|---|
| 5,999,734 A | * | 12/1999 | Willis et al. | 717/149 |
| 2002/0095666 A1 | * | 7/2002 | Tabata et al. | 717/149 |
| 2003/0191792 A1 | * | 10/2003 | Waki et al. | 709/100 |
| 2004/0098710 A1 | * | 5/2004 | Radigan | 717/144 |
| 2007/0079298 A1 | * | 4/2007 | Tian et al. | 717/140 |

OTHER PUBLICATIONS

Barsness, et al., U.S Patent Application, Entitled, "Sharing Compiler Optimizations in a Multi-Node System,".

* cited by examiner

*Primary Examiner* — Don Wong
*Assistant Examiner* — Lynda Dinh
(74) *Attorney, Agent, or Firm* — Patterson & Sheridan LLP (57) ABSTRACT

Embodiments of the invention enable application programs running across multiple compute nodes of a highly-parallel system to compile source code into native instructions, and subsequently share the optimizations used to compile the source code with other nodes. For example, determining what optimizations to use may consume significant processing power and memory on a node. In cases where multiple nodes exhibit similar characteristics, it is possible that these nodes may use the same set of optimizations when compiling similar pieces of code. Therefore, when one node compiles source code into native instructions, it may share the optimizations used with other similar nodes, thereby removing the burden for the other nodes to figure out which optimizations to use. Thus, while one node may suffer a performance hit for determining the necessary optimizations, other nodes may be saved from this burden by simply using the optimizations provided to them.

15 Claims, 7 Drawing Sheets

SHARING COMPILER OPTIMIZATIONS IN A MULTI-NODE SYSTEM

BACKGROUND OF THE INVENTION

1. Field of the Invention

Embodiments of the invention relate to improving the efficiency of multi-node computing systems. More specifically, embodiments of the invention may be configured to improve performance on a multi-node computing system by selectively compiling source code to native instructions among compute nodes of such a system.

2. Description of the Related Art

Powerful computers may be designed as highly parallel systems where the processing activity of thousands of processors (CPUs) is coordinated to perform computing tasks. These systems are highly useful for a broad variety of applications, including financial modeling, hydrodynamics, quantum chemistry, astronomy, weather modeling and prediction, geological modeling, prime number factoring, and image processing (e.g., CGI animations and rendering), to name but a few examples.

For example, one family of parallel computing systems has been (and continues to be) developed by International Business Machines (IBM) under the name Blue Gene®. The Blue Gene/L architecture provides a scalable, parallel computer that may be configured with a maximum of 65,536 ($2^{16}$) compute nodes. Each compute node includes a single application specific integrated circuit (ASIC) with 2 CPU's and memory. The Blue Gene/L architecture has been successful and on Oct. 27, 2005, IBM announced that a Blue Gene/L system had reached an operational speed of 280.6 teraflops (280.6 trillion floating-point operations per second), making it the fastest computer in the world at that time. Further, as of June 2005, Blue Gene/L installations at various sites worldwide were among five out of the ten top most powerful computers in the world.

The compute nodes in a parallel system typically communicate with one another over multiple communication networks. For example, the compute nodes of a Blue Gene/L system are interconnected using five specialized networks. The primary communication strategy for the Blue Gene/L system is message passing over a torus network (i.e., a set of point-to-point links between pairs of nodes). The torus network allows application programs developed for parallel processing systems to use high level interfaces such as Message Passing Interface (MPI) and Aggregate Remote Memory Copy Interface (ARMCI) to perform computing tasks and distribute data among a set of compute nodes. Of course, other message passing interfaces have been (and are being) developed. Additionally, the Blue Gene/L includes both a collective network and a global interrupt network. Further, certain nodes are also connected to a gigabit Ethernet. These nodes are typically used to perform I/O operations between the Blue Gene core and an external entity such as a file server. Other massively parallel architectures also use multiple, independent networks to connect compute nodes to one another.

Massively parallel systems such as the Blue Gene architecture were originally designed to support a SIMD (Single Instruction Multiple Data) programming paradigm. This typically involves running one large scale tightly coupled MPI-based application across all of the compute nodes in a partition. In comparison to other available packaging strategies, the Blue Gene packaging produces many teraflops per rack, has a large memory footprint, and low power consumption. This also makes the Blue Gene architecture attractive for a High Throughput Computing (HTC) model. HTC provides a computing model that allows for independent work units on each node. A launcher program resides on each compute node of a massively parallel system. The launcher program listens for work-requests from a scheduler, performs the request, and restarts. In such a case, each node in the system executes the same program, but may execute different portions of the program, depending on the actual work request taken up by a node. The scheduler is generally an external program transferring work requests to the launcher collective.

SUMMARY OF THE INVENTION

One embodiment of the invention provides a computer-implemented method for optimizing a program executing on plurality of compute nodes of a massively parallel computing system. This method may generally include identifying a plurality of blocks of code included in the program and selecting, for at least a first block of code, a plurality of sets of optimization parameters to use in compiling the first block of code into a set of native instructions. The method may further include transmitting one of the sets of optimization parameters to each of the plurality of compute nodes, compiling, by each of the plurality of compute nodes, the first block of code using the set of optimization parameters received by a respective compute node, and monitoring at least a performance characteristic of the program when the set of native instructions generated by compiling the block of code according to the set of optimization parameters are executed by one of the compute nodes.

Another embodiment of the invention includes a computer-readable storage medium containing a program which, when executed by a processor, performs an operation for optimizing an application program executing on plurality of compute nodes of a massively parallel computing system. The operation may generally include identifying a plurality of blocks of code included in the program and selecting, for at least a first block of code, a plurality of sets of optimization parameters to use in compiling the first block of code into a set of native instructions. The method may further include transmitting one of the sets of optimization parameters to each of the plurality of compute nodes, compiling, by each of the plurality of compute nodes, the first block of code using the set of optimization parameters received by a respective compute node, and monitoring at least a performance characteristic of the program when the set of native instructions generated by compiling the block of code according to the set of optimization parameters are executed by one of the compute nodes.

Still another embodiment of the invention includes a system having a plurality of compute nodes, each having a processor and a memory, and each executing an application program. The system may further include a service node having a processor and a memory, and executing program, which when executed on the service node performs an operation for optimizing the application program executing on the plurality of compute nodes. The operation may generally include identifying a plurality of blocks of code included in the program, and selecting, for at least a first block of code, a plurality of sets of optimization parameters to use in compiling the first block of code into a set of native instructions. The operation may further include transmitting one of the sets of optimization parameters to each of the plurality of compute nodes, compiling, by each of the plurality of compute nodes, the first block of code using the set of optimization parameters received by a respective compute node, and monitoring at least a performance characteristic of the program when the set of native instructions generated by compiling the block of code according to the set of optimization parameters are executed by one of the compute nodes.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention enable application programs running across multiple compute nodes of a highly-parallel system to selectively compile source code (or bytecode) into native instructions as well as to share optimizations used to compile the source code with other nodes. Sharing optimization hints may reduce each node's burden in determining the best native instructions to create for a given block of code (e.g., a method, object, class or package, etc.) on a given node. Determining what optimizations to use frequently consumes significant processing power and memory on a node. However, when multiple compute nodes exhibit similar characteristics, and run the same underlying applications, it is possible that these nodes may use the same set of optimizations when compiling similar (or the same) pieces of code. For example, when one node selects to compile a block of source code (or bytecode), it may share what optimizations were used with other similar nodes, thereby removing the burden to determine which optimizations to use for a given block of code. Thus, while one node may suffer a performance hit when determining the necessary optimizations, other nodes may avoid this burden by simply using the optimizations determined to be effective for the given bock of source code. In one embodiment, a central node may be used to track what optimizations were applied to what portions of compiled code and evaluate the effectiveness of different optimization parameters.

Further, in addition to sharing optimization hints to reduce each node's burden in determining the best native instructions to create for a given method on a given node, the process may be divided across nodes. This may be accomplished by segregating packages, classes, and/or methods such that some nodes determine the proper native code for certain blocks of the code. That is, the optimization problem may be parallelized by selecting different nodes to evaluate different portions of source code.

In one embodiment, when a given block of code is selected to be compiled, the compute node may request that another node actually perform the compilation. For example, if a node determines that compiling the block of code locally requires a significant amount of local resources, it may in some cases off-load the task to a remote node. Once the remote node compiles the source code to native instructions, it may subsequently transmit the native instructions back to the local node.

Further, nodes may also cooperatively try out different combinations of optimizations, and share the results with other nodes (or with a centralized manager). In this way, as nodes determine more and more effective optimizations, this information may be shared with other nodes allowing them to recompile their code using the more effective optimizations.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
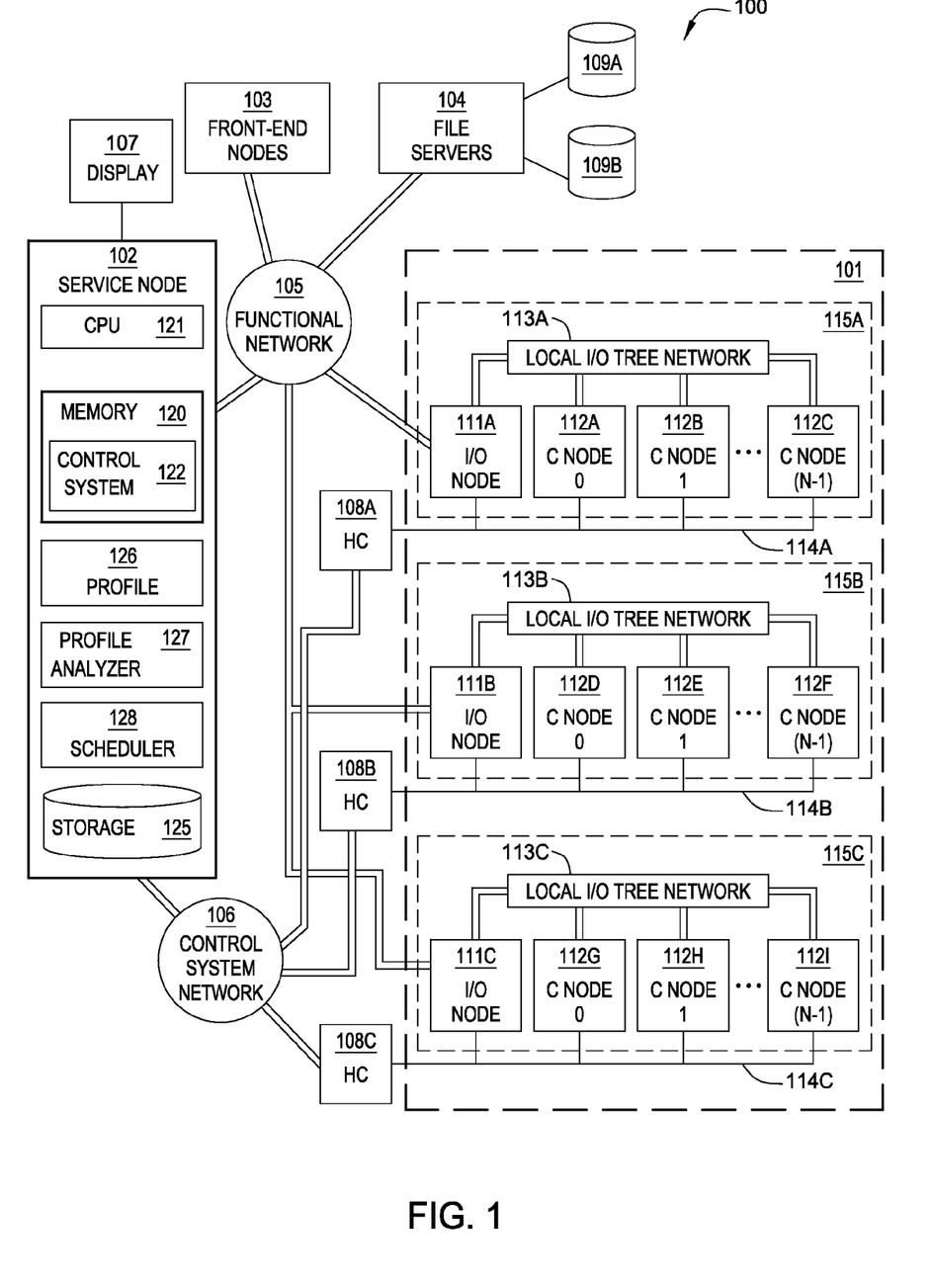
FIG. 1 is a block diagram of illustrating components of a massively parallel computer system, according to one embodiment of the invention.

FIG. 1 is a block diagram illustrating components of a massively parallel computer system 100, according to one embodiment of the present invention. Illustratively, computer system 100 shows the high-level architecture of an IBM Blue Gene® computer system, it being understood that other parallel computer systems could be used, and the description of a preferred embodiment herein is not intended to limit the present invention.

As shown, computer system 100 includes a compute core 101 having a plurality of compute nodes 112 arranged in a regular array or matrix. Compute nodes 112 perform the useful work performed by system 100. The operation of computer system 100, including compute core 101, may be controlled by service node 102. Various additional processors in front-end nodes 103 may perform auxiliary data processing functions, and file servers 104 provide an interface to data storage devices such as disk based storage 109A, 109B or other I/O operations. Functional network 105 provides the primary data communication path among compute core 101 and other system components. For example, data stored in storage devices attached to file servers 104 is loaded and stored to other system components through functional network 105.

Also as shown, compute core 101 includes I/O nodes 111A-C and compute nodes 112A-I. Compute nodes 112 provide the processing capacity of parallel system 100, and are configured to execute applications written for parallel processing. I/O nodes 111 handle I/O operations on behalf of compute nodes 112. For example, the I/O node 111 may retrieve data from file servers 104 requested by one of compute nodes 112. Each I/O node 111 may include a processor and interface hardware that handles I/O operations for a set of N compute nodes 112, the I/O node and its respective set of N compute nodes are referred to as a Pset. Compute core 101 contains M Psets 115A-C, each including a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by compute core 101 to execute user applications, as well as data output produced by the compute core 101, is communicated over functional network 105. The compute nodes within a Pset 115 communicate with the corresponding I/O node over a corresponding local I/O collective network 113A-C. The I/O nodes, in turn, are connected to functional network 105, over which they communicate with I/O devices attached to file servers 104, or with other system components. Thus, the local I/O collective networks 113 may be viewed logically as extensions of functional network 105, and like functional network 105, are used for data I/O, although they are physically separated from functional network 105.

Service node 102 may be configured to direct the operation of the compute nodes 112 in compute core 101. In one embodiment, service node 102 is a computer system that includes a processor (or processors) 121, internal memory 120, and local storage 125. The service node 102 may also include profile 126, a profile analyzer 127, and a scheduler 128. An attached console 107 (i.e., a keyboard, mouse, and display) may be used by a system administrator or similar person to initialize computing jobs on compute core 101. Service node 102 may also include an internal database which maintains state information for the compute nodes in core 101, and an application which may be configured to, among other things, control the allocation of hardware in compute core 101, direct the loading of data on compute nodes 111, migrate processes running on one of compute nodes 112 to another one of compute nodes 112, and perform diagnostic and maintenance functions.

The profile 126 may maintain a profile for various blocks of source code (e.g. methods, classes, and packages, and the like) of an application running on the compute nodes 112. Accordingly, while only one profile 126 is shown, the service node 102 may include a plurality of profiles 126. The profile 126 may include information indicating the overhead (i.e. CPU/memory usage) incurred by running the source code on a particular compute node 112. The profile may also include information indicating the optimizations used to compile the source code into native instructions, along with the overhead incurred performing the compile.

The profile 126 may be analyzed by the profile analyzer 127. The profile analyzer 127 may determine any performance gains achieved by compiling the source code to native instructions. For example, the profile analyzer 127 may determine that the execution time of the native instructions is faster than the execution time of the source code.

Furthermore, the profile analyzer 127 may also determine whether execution performance of an application running on other compute nodes 112 may benefit from compiling a given blocks of source code. By evaluating the profiles of methods, classes, packages, etc., running on different compute nodes 112, the profile analyzer 127 may determine that a plurality of compute nodes 112 exhibit similar behavior. Therefore, the performance gains achieved by compiling source code to native instructions on a first compute node 112, is likely to result in similar performance gains on a second compute node 112 having similar characteristics. Therefore, the service node 102 may schedule a compilation to the other similar compute nodes. Furthermore, the service node 102 may also share the optimizations used to compile the source code on the first compute node to the second node, thereby removing the burden on the second mode to determine which optimizations to use.

In one embodiment, the profile 126, the profile analyzer 127 and the scheduler 127 may reside on one (or more) of the compute nodes 112 of the compute core 101. In this case, the compute node may act as a central node configured to build and evaluate profiles and share the compiler optimizations used by one compute node 112 with other compute nodes 112 of the compute core 101. In another embodiment, the profile 126, the profile analyzer 127 and the scheduler 127 may reside on any of the front-end nodes 103.

Illustratively, memory 120 also includes a control system 122. In embodiments of the invention, Control system 122 may be a software application configured to control the allocation of compute nodes 112 in compute core 101, direct the loading of application and data on compute nodes 111, and perform diagnostic and maintenance functions, among other things.

In one embodiment, service node 102 communicates control and state information with the nodes of compute core 101 over control system network 106. Network 106 is coupled to a set of hardware controllers 108A-C. Each hardware controller communicates with the nodes of a respective Pset 115 over a corresponding local hardware control network 114A-C. The hardware controllers 108 and local hardware control networks 114 are logically an extension of control system network 106, although physically separate. In one embodiment, control system network 106 may include a JTAG (Joint Test Action Group) network, configured to provide a hardware monitoring facility. As is known, JTAG is a standard for providing external test access to integrated circuits serially, via a four- or five-pin external interface. The JTAG standard has been adopted as an IEEE standard. Within a Blue Gene system, the JTAG network may be used to send performance counter data to service node 102 in real-time. That is, while an application is running on compute core 101, network performance and/or network state data may be gathered and transmitted to service node 102 without affecting the performance of that application. In one embodiment, the profile analyzer 127 may access information about the performance of an application, and the result of different compilation optimizations, by querying individual compute nodes 112 over control network 106. Of course, other massively parallel architectures may similarly provide this (or other mechanisms) for monitoring and querying application state on a collection of compute nodes.

In addition to service node 102, front-end nodes 103 provide computer systems used to perform auxiliary functions which, for efficiency or otherwise, are best performed outside compute core 101. Functions which involve substantial I/O operations are generally performed in the front-end nodes 103. For example, interactive data input, application code editing, or other user interface functions are generally handled by front-end nodes 103, as is application code compilation. Front-end nodes 103 are also connected to functional network 105 and may communicate with file servers 104.

The scheduler 128 may be configured to provide an application program configured to respond to work requests made by an application executing on one of the compute nodes 112. In one embodiment, the same application executes on each of a group of compute nodes 112 (commonly referred to as a partition) and each node submits work requests to the scheduler 128. Further, as a given compute node in the group completes executing an assignment received from the scheduler 128, results may be returned to a central node (or group of nodes), to the scheduler, or to another application tasked with receiving and processing results. At the same time, each compute node 112 may select to compile blocks of code included in the application, or different optimizations to use when compiling a given block of code.

Figure 2:
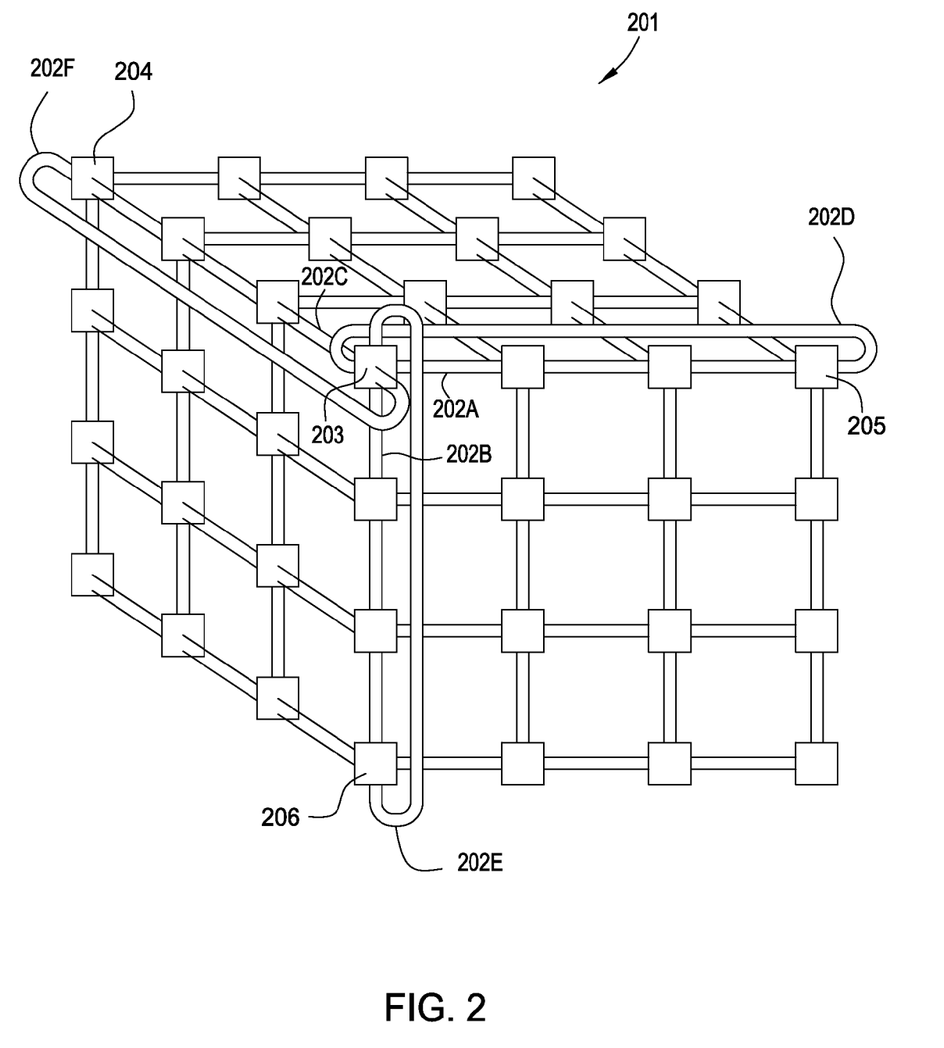
FIG. 2 is an illustration of a three-dimensional torus network of system, according to one embodiment of the invention.

As stated, in a massively parallel computer system 100, compute nodes 112 may be logically arranged in a three-dimensional torus, where each compute node 112 may be identified using an x, y and z coordinate. FIG. 2 is a conceptual illustration of a three-dimensional torus network of system 100, according to one embodiment of the invention. More specifically, FIG. 2 illustrates a 4×4×4 torus 201 of compute nodes, in which the interior nodes are omitted for clarity. Although FIG. 2 shows a 4×4×4 torus having 64 nodes, it will be understood that the actual number of compute nodes in a parallel computing system is typically much larger. For example, a Blue Gene/L system may be configured with 65,536 compute nodes 112 along with and an additional 1024 I/O nodes 111. Illustratively, each compute node 112 in torus 201 includes a set of six node-to-node communication links 202A-F which allows each compute nodes in torus 201 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 201, as shown in FIG. 2, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y, or z dimensions form a torus in that dimension because the point-to-point communication links logically wrap around. For example, this is represented in FIG. 2 by links 202D, 202E, and 202F which wrap around from compute node 203 to other end of compute core 201 in each of the x, y and z dimensions. Thus, although node 203 appears to be at a "corner" of the torus, node-to-node links 202A-F link node 203 to nodes 204, 205, and 206, in the x, y, and Z dimensions of torus 201.

Figure 3:
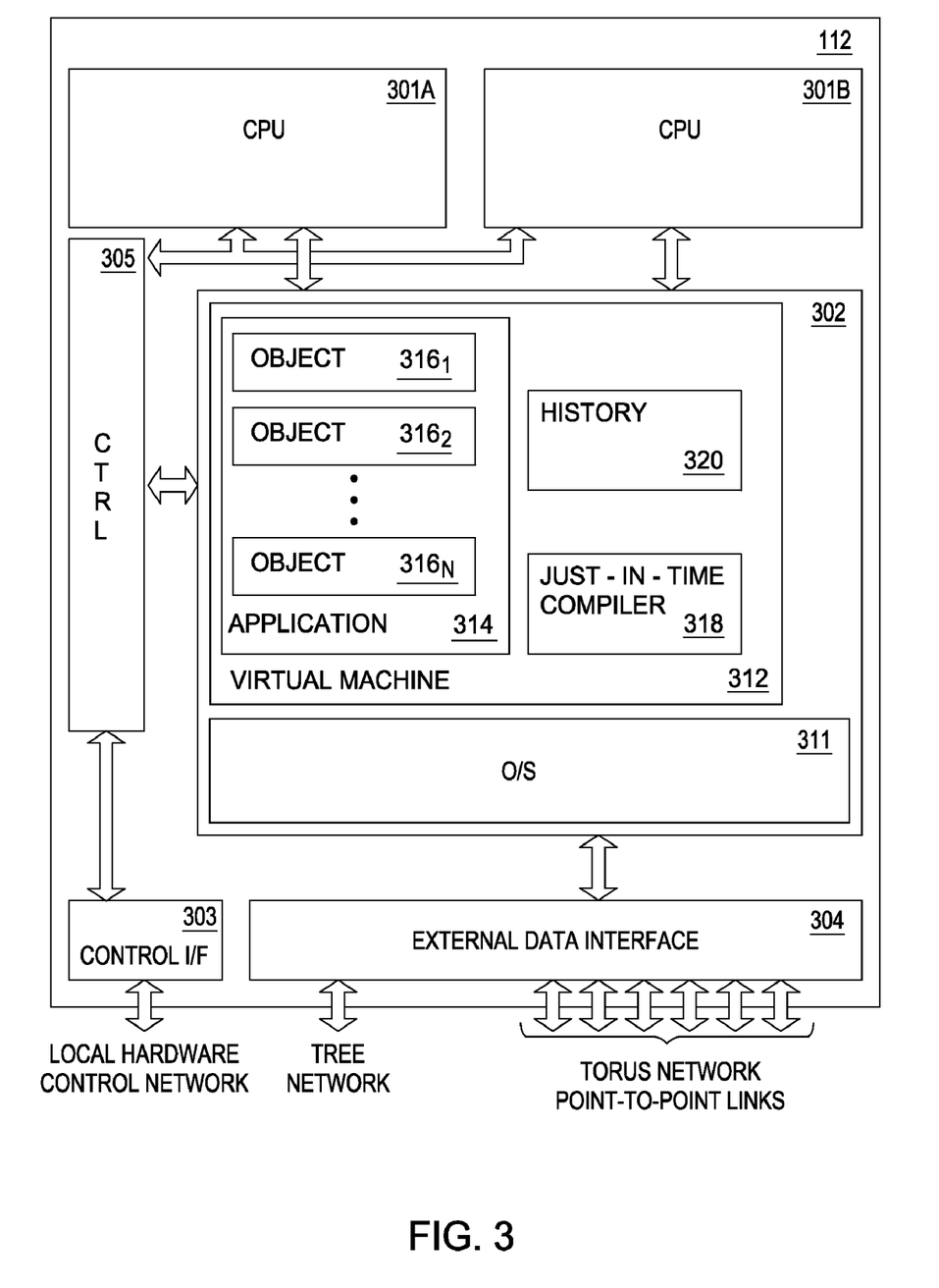
FIG. 3 illustrates components of a compute node of the system of FIG. 1, according to one embodiment of the invention.

FIG. 3 illustrates components of a compute node 112 of the system 100 of FIG. 1, according to one embodiment of the invention. As shown, compute node 112 includes processor cores 301A and 301B, each having an instruction address register 306A and 306B. Compute node 112 also includes memory 302 used by both processor cores 301; an external control interface 303 which is coupled to local hardware control network 114 (e.g., control system network 106); an external data communications interface 304 which is coupled to the corresponding local I/O collective network 113 and the corresponding six node-to-node links 202 of the torus network 201; and includes monitoring and control logic 305 which receives and responds to control commands received through external control interface 303. Monitoring and control logic 305 may access processor cores 301 and locations in memory 302 on behalf of service node 102 to read (or in some cases alter) the operational state of node 112. In one embodiment, each compute node 112 may be physically implemented as a single integrated circuit.

As described, functional network 105 may service many I/O nodes 113, and each I/O node 113 is shared by a group of compute nodes 112 (i.e., a Pset). Thus, it is apparent that the I/O resources of parallel system 100 are relatively sparse when compared to computing resources. Although it is a general purpose computing machine, parallel system 100 is designed for maximum efficiency in applications which are computationally intense.

As shown in FIG. 3, memory 302 stores an operating system image 311. Operating system image 311 provides a copy of a simplified-function operating system running on compute node 112, referred to as a compute node kernel. The compute node kernel provides a minimal set of functions required to support operation of the compute node 112. In one embodiment, a virtual machine 312 may also reside within memory 302. The virtual machine 312 running on compute node 112 may be configured to execute applications created for the virtual machine 312. For example, the virtual machine 312 may be an implementation of a Java® virtual machine and operating environment available from Sun Microsystems, Inc.

Furthermore, a copy of the virtual machine 312 may be present and executing on thousands of compute nodes 112, where, in one embodiment, each compute node executes the same application but maintains application data local to a given compute node 112. For example, as described above each compute node 112 may be configured to request work from a scheduler 128 and process tasks received from the scheduler 128 to, collectively, perform a computing task. In another embodiment, some compute nodes may execute a different application, or simply remain idle. Further, applications running on the compute nodes 112 may be configured to share and transfer application data using well known message passing techniques (e.g., MPI or ARMCI).

Illustratively, virtual machine 312 is shown executing application 314. In the case of a Java® based virtual machine, application 314 may be written using a programming language and compiler configured to generate bytecode (from source code, i.e. classes, methods, packages, etc.) for the particular virtual machine 312. In turn, the virtual machine 312 may execute application 314 by interpreting the compiled bytecode into instructions understandable by processor cores 301A and 301B.

While executing, the application 314 may instantiate objects $316_1$, $316_2$, $316_n$ by dynamically allocating memory. For example, the Java® programming language provides the "new" operator used to create an object and allocate memory at runtime for that object. Other programming languages provide similar constructs. Each object $316_1$, $316_2$, $316_n$ may be defined by a class (or the bytecode of the given class), and therefore, each object $316_1$, $316_2$, $316_n$ may be an instance of the class. Furthermore, each object may have an associated method, which may provide a mechanism for manipulating and accessing (i.e reading and writing) data stored in an object or a class. Accordingly, objects $316_1$, $316_2$, $316_n$ may also be representative of a class or a method for the objects $316_1$, $316_2$, $316_n$ or simply the bytecode for the given method or class.

As illustrated, virtual machine 312 may also include a just-in-time compiler 318. In one embodiment, the just-in-time compiler 318 may compile the bytecode of a given method class or package to native instructions, i.e., to a set of instructions that may be executed on CPU 301A and CPU 301B directly, without the need to be interpreted by the virtual machine 302. Once compiled, calls to the method or class may be handled by the native instructions instead of the virtual machine's 312 interpretation of the code.

In one embodiment, the just-in-time compiler 318 may compile the bytecode associated with a given block of code once it has been accessed and interpreted a certain number of times. This is also known as Mixed Mode Interpretation (MMI) to those skilled in the art. With MMI, a count may be kept of the number of times each application's method or class is executed. Bytecode corresponding to the method may be interpreted until that count reaches a predetermined threshold value. In this way, for methods used only a small number of times, the overhead incurred to perform a just-in-time compilation may be avoided. For methods that are frequently reused when the threshold count is reached, just-in-time compilation may be performed, and method execution time may be optimized.

As further shown in FIG. 3, the virtual machine 312 may also include a history 320. The history 320 may store information regarding the execution times of methods before and after compilation. The history may also include the compiler optimizations used to compile the methods. Additionally, the history may also include the compute resources (i.e. memory and CPU usage) used to compile the method, and the resources used to execute a method (pre and post-compilation). Thus, over time, the history 320 may provide a profile of a method's behavior (and effectiveness) on a given node.

When performing a just-in-time compilation, the just-in-time compiler 318 may use a variety of different compiler optimizations (i.e. aggressive method inlining, dataflow-based optimizations, loop optimizations, etc.). The optimizations used may be dependent on the characteristics of the compute node 112 on which the application 314 is running. For example, the compilation may be optimized to a targeted CPU's instruction set and operating system model where the application 314 runs. Furthermore, the just-in-time compiler 318 may also make optimizations using the profile 126 generated for methods of an object invoked by the application 314.

In one embodiment, the virtual machine 312 and just-in-time compiler 318 may evaluate history 320 to determine locally what optimizations to make when compiling a given block of code. Furthermore, each compute node 112 may share the optimizations used with other nodes in the system 101. For example, in one embodiment, a compute node 112 may communicate a set of optimizations, along with the other information stored in its history 320, to the service node 102. In turn, the service node 102 may store this information along with a profile 126 for each method invoked by an application running on the compute nodes 112. In another embodiment, the service node 102 may periodically poll the compute nodes and gather information stored in the history 320 of each of the compute nodes 112.

Figure 4:
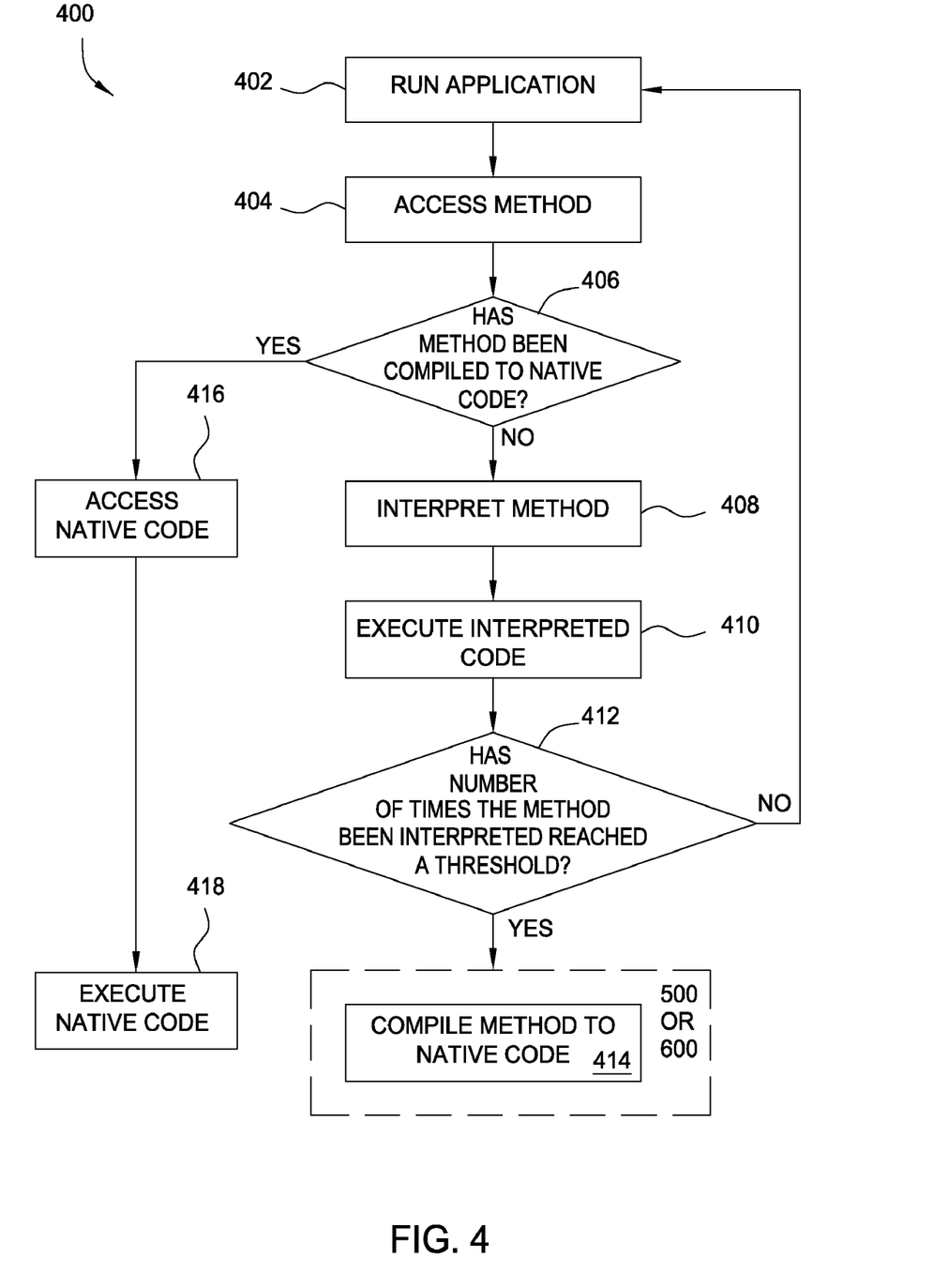
FIG. 4 is a flowchart illustrating a method for compiling source code, according to one embodiment of the invention.
Figure 5:
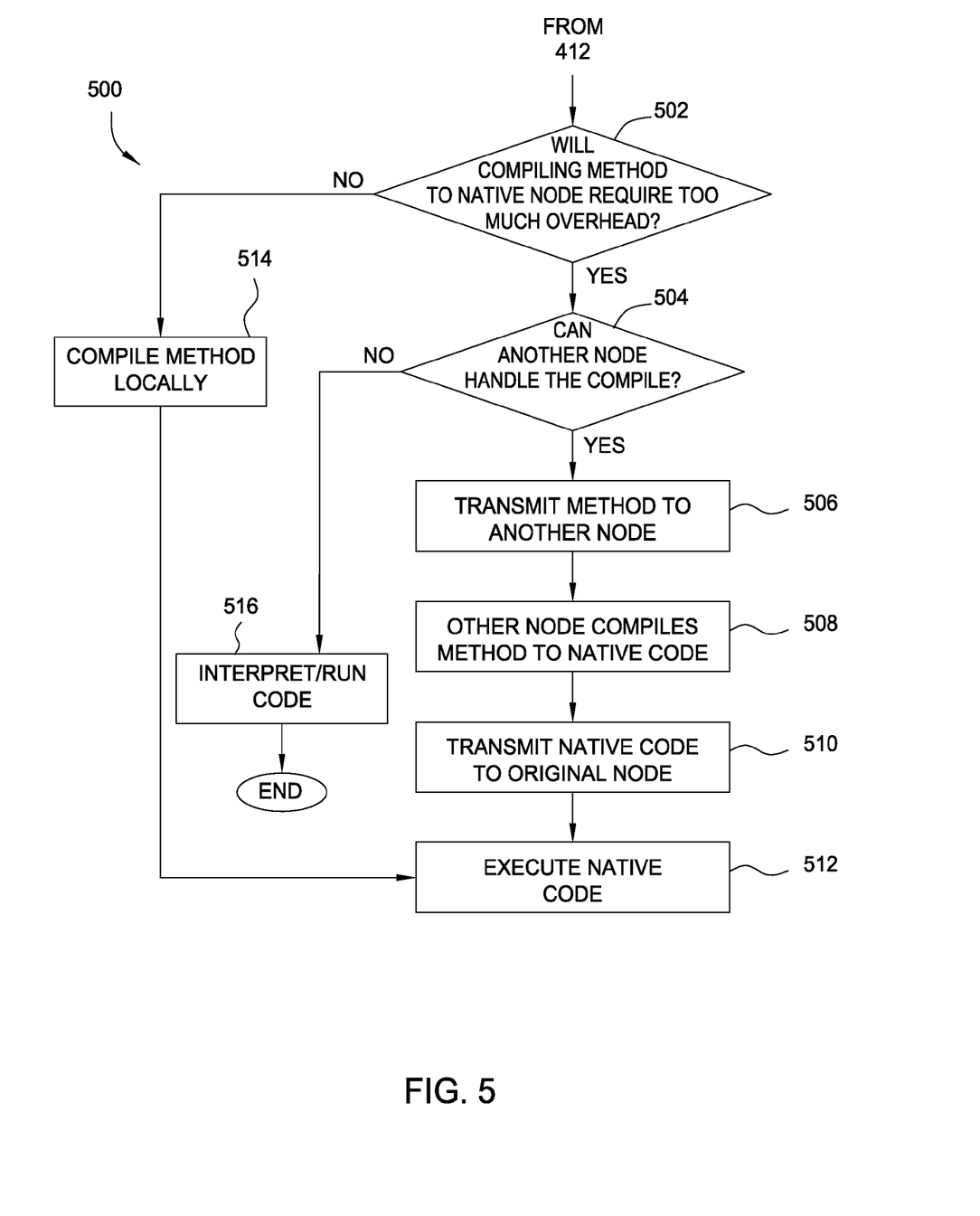
FIG. 5 is a flowchart illustrating a method for distributing compiled code among compute nodes of a massively parallel computer system, according to one embodiment of the invention.
Figure 6:
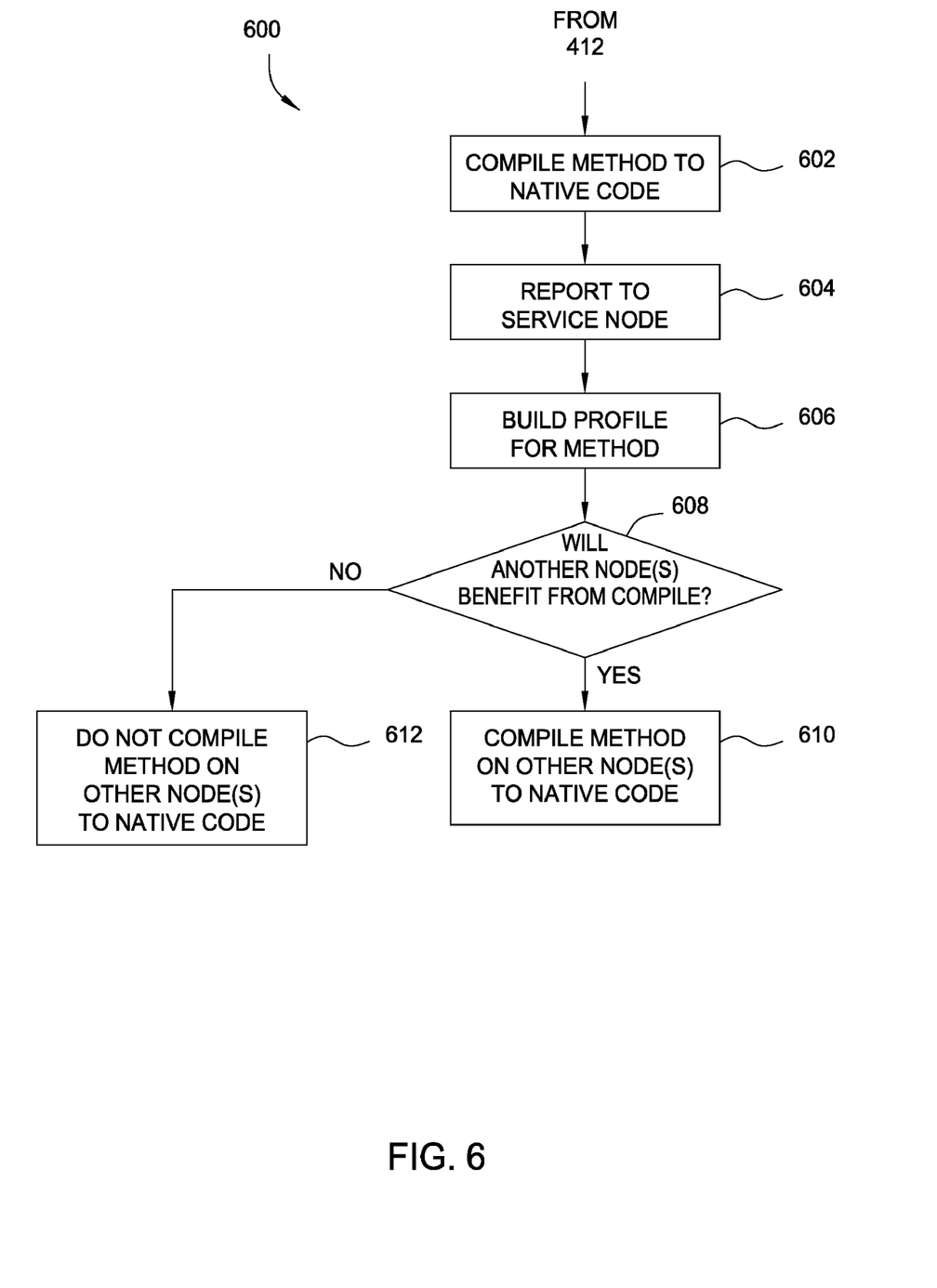
FIG. 6 is a flowchart illustrating a method for compiling source code having similar characteristics on compute nodes of a massively parallel computer system, according to one embodiment of the invention.

FIGS. 4-6 illustrate an example of operations for compiling source code (or bytecode). Specifically, FIG. 4 illustrates a method 400 for compiling source code (i.e. a method, classes, and/or packages associated with an application program), according to one embodiment of the invention. As shown, the method 400 begins at step 402, where an application 314 is executed on a compute node 112. At step 404, a method of the application 314 is accessed. That is, the application 312 may invoke the execution of a block of instructions associated with the application 402, e.g., a sequence of bytecode representing an object method. At step 406, the virtual machine 312 may determine whether the block of instructions has been compiled to native instructions. If so, the virtual machine may access the native instructions (step 416) and subsequently execute the native instructions (step 418).

However, in the case where the block of code has not been compiled to native instructions, at step 408, the virtual machine may interpret the bytecode into instructions understandable by the CPU(s) 301A, 301B of the compute node 112. Once interpreted, then at step 410, the virtual machine 312 may execute the interpreted code. At step 412, the virtual machine 312 may determine if the number of times the block of code has been interpreted has reached a specified threshold. In this case, the virtual machine 312 may track the number of times that a given method has been accessed and interpreted. If the number of times exceeds the threshold, the virtual machine may subsequently compile the method into native instructions using the just-in-time compiler 318 (step 414). However, if the number of times does not exceed the threshold, the method 400 returns to step 402, where the application 312 continues to execute.

FIG. 5 illustrates a method 500 for compiling a block of code (e.g., bytecode) to native instructions, according to one embodiment of the invention. Specifically, method 500 illustrates a technique to distribute the compilation of a method from a first compute node 112 to a second compute node 112. As shown, method 500 begins at step 502, where it is determined whether the amount of computing resources (e.g., memory, processor cycles) required to compile the block of code exceeds a predetermined threshold. If not, at step 514, the block of code may be compiled locally using the just-in-time compiler 318. Further, in one embodiment, the just-in-time compiler may select a set of optimizations to apply to the block of code during the compilation process and share what optimizations were selected with the profile analyzer 128. At step 512, the virtual machine 312 may execute the native instructions.

However, at step 502, the virtual machine 312 may determine that the compiling the block of code would exceed the capacity of available computing resources on node 112. In such a case, at step 504, the virtual machine 312 may determine if another compute node 112 can handle the compile. Accordingly, in one embodiment, the virtual machine 312 running on the first compute node 112 may be configured to communicate with a second compute node 112 to determine whether the second compute node has computing resources available to perform the compilation. If so, then at step 506, the bytecode may be transmitted to the second compute node 112. If not, then at step 516, the block of code may be interpreted by the virtual machine running on the first compute node, skipping compilation altogether.

Once the block of code is transmitted to the second compute node 112, at step 508, the second compute node may compile the block of code to native instructions. After compilation, at step 510, the second compute node 112 may transmit the native instructions back to the original node. Subsequently, at step 512, once the native instructions are returned, the first node may execute the native instructions locally. Further, in one embodiment, the just-in-time compiler 318 may select a set of optimizations to apply to the block of code during the compilation process and share what optimizations were selected with the profile analyzer 128. At step 516, the virtual machine 312 may execute the native instructions.

FIG. 6 illustrates a method 600 for distributing blocks of source code for compilation by a plurality of compute nodes, according to one embodiment of the invention. As discussed above, a compute node 112 may share the optimizations used to compile a given block of code (e.g., bytecode representing a given method, object, class or package). In doing so, other nodes may reduce the burden of determining an optimal sequence of native instructions to create for a given block of code. As shown, method 600 begins at step 602, where a block of code is compiled to native instructions. At step 604, once a block of code has been compiled to native instructions, the compute node 112 may notify the service node 102 of the compile and the set of optimizations used to compile the block of code.

In one embodiment, the compute nodes 112 and the service node 102 may be configured to share data using well known message passing techniques (e.g., MPI or ARMCI). In another embodiment, the service node 102 may use the JTAG network to gather data. For example, the JTAG network may be used to periodically poll the compute nodes 112 to collect information from the history 320 of a compute node 112. The information collected may include which blocks of code present on a respective compute node 112 have been compiled to native machine instructions. Other information collected may include, e.g., execution times for a method (before and after the method has been compiled), the optimizations used to compile the method(s), and the compute resources required to compile the method(s).

At step 606, the information is returned to the service node 102, where at step 606, it is used to build a profile 126 for the block of code. The profile 126 may be analyzed by the profile analyzer 127 to determine performance gains achieved as a result of compiling the block of code to native instructions. For example, in one embodiment, the profile analyzer 127 may compare execution times for a method before and after being compiled to native instructions to determine which version of the code performs faster, uses less memory, or how the native performance affect application performance suing another measured performance characteristic.

Additionally, the profile analyzer 127 may also perform a comparative analysis between profiles 126 of a given block of code executing on different compute nodes 112. For example, the profile analyzer 127 may compare different profiles 126 and determine that two or more compute nodes exhibit similar characteristics. For example, the two or more compute nodes may execute the same blocks of code (i.e. methods, classes, etc.). Thus, if it is determined that compiling a block of code to native instructions on a first compute node results in a performance gain, then compiling the same block of code on a similar compute node may result in a similar performance gain.

Accordingly, at step 608, the profile analyzer 127 may determine that another compute node may benefit (i.e. achieve a performance gain) from compiling a block of code to native instructions. In response, at step 610, the scheduler 128 of the service node 102 may send a command (i.e. via an MPI message) to other nodes to compile the block of code using the same optimizations used to compile that block of code on the first node. That is, in one embodiment, the scheduler 128 may simply pass the optimizations used in the first node to the other nodes having similar characteristics. The other nodes may store the optimizations locally, and access them when compiling a given block of code.

In another embodiment, the scheduler 128 may also expedite the compilation on the other node(s). For example, the command to compile the method may also be configured to lower the threshold for the number of times a method needs to be interpreted before being compiled. In another embodiment, the scheduler may set the threshold to zero, thereby effectively bypassing the threshold altogether. In this case, the block of code may be compiled the next time it is accessed. In the case where the profile analyzer 127 determines that other compute nodes may not achieve a performance gain (or possibly experience a performance loss), at step 612, then the block of code is not compiled.

In one embodiment, the profile analyzer 127 may also be configured to perform a comparative analysis to determine an optimal set of optimization parameters to compile a particular block of code. For example, different compute nodes 112 may compile an object method using different optimizations parameters. Therefore, in one embodiment, the profile analyzer 127 may evaluate the optimizations performed of the same block of code, compiled using different optimization parameters, to identify which optimizations result in the greatest performance gain. In one embodiment, the profile analyzer 127 may compare the post-compilation execution times of similar methods and determine which optimization techniques resulted in the fastest execution times (or lowest memory usage, or "best" result for another performance metric). Once determined, the scheduler 127 may send a message to compute nodes executing the same application to compile the given block of code method using the identified optimizations.

In another embodiment, the profile analyzer 127 may determine that the optimizations resulting in the fastest execution time also require extensive compute power and/or memory. In such a case, the profile analyzer 127 may first evaluate whether a given compute node 112 has adequate resources to support running the native code using these optimizations. Consider an example where a first compute node and second compute node both execute the same method. However, suppose that the first compute node performs far less operations than the second compute node. If the first compute node compiles the method using optimizations that result in a fast execution time, and also require an extensive amount of compute resources, the first compute node may not be affected, since the first compute node does not perform many operations to begin with. Therefore, the first compute node can afford to execute the method compiled with these optimizations. However, if the second compute node compiles its method with the same optimizations, it may suffer from a performance hit. That is, while the one method may execute quickly, the other operations performed by the second node may perform slowly due to the resource consumption by the compiled method. Therefore, in one embodiment, the profile analyzer 127 may determine a different set of optimizations for a compute node to use for compiling the method.

In another embodiment, the compute nodes 112 may cooperatively test out different setting for optimization parameters for the same block of code. For example, the scheduler 127 may send a different set of optimization parameters to different compute nodes 112 executing the same block of code. After the compute nodes 112 are done compiling the methods, the service node 102 may gather information from the history 320 of each of the compute nodes 112, and store this information in a profile 126 associated with the block of code. Thereafter, the profile analyzer 127 may perform a comparative analysis for the different optimizations and determine which optimization was the most effective (e.g., in terms of execution time, resource consumption, or other performance metrics). Once the most effective optimization is identified, the service node 102 may send a message to the nodes to recompile this block of code using the most effective optimization parameters.

Figure 7:
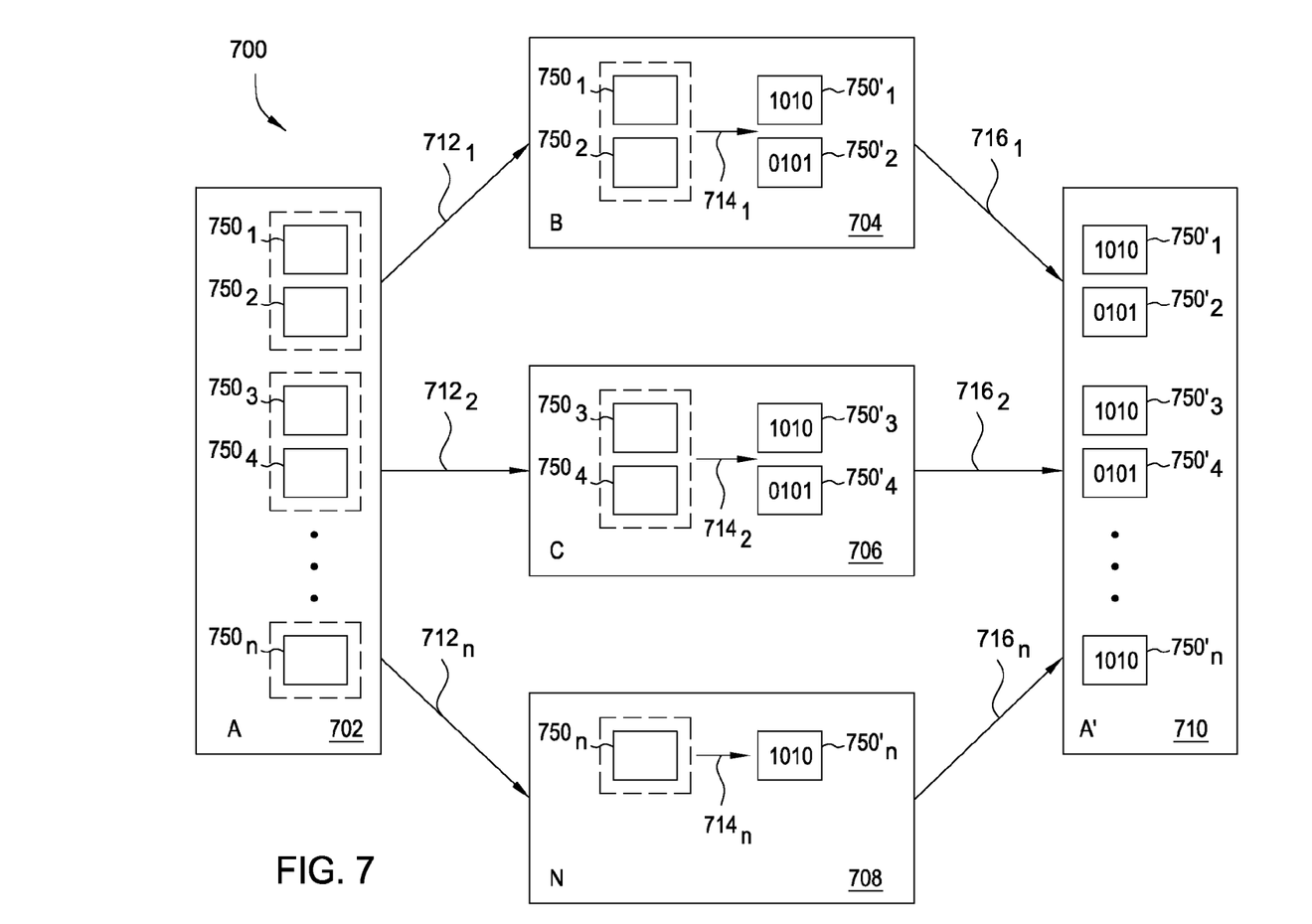
FIG. 7 illustrates an example of a plurality of compute nodes performing aspects of the shown in of FIG. 5, according to one embodiment of the invention.

FIG. 7 illustrates an example of a plurality of compute nodes 700 performing the compilation method of FIG. 5. As shown, the plurality of compute nodes 700 includes a local node A 702 and first remote node B 704, a second remote node C 706 and an Nth remote node N 708. Also shown is the local node A' 710, which illustrates local node A 702 after the compilation method is complete.

The local node A 702 is shown executing a plurality of methods or classes $750_1$-$750_n$ for an application. In one embodiment, for example in a Java® environment, the methods or classes may be compiled bytecode. As stated earlier, bytecode may be interpreted into instructions understandable by a processor by a virtual machine. After the number of times a given block of code has been interpreted reaches a threshold, the local node may invoke a just-in-time compiler 318 to compile the block of code to native instructions. Furthermore, as discussed in reference to FIG. 5, the local node A 702 may decide that compiling the block of code may consume an excessive amount of compute resources. As a result, the local node A 702 may transmit the block of code (e.g., the particular sequence of bytecode) to a remote node for compilation.

Accordingly, local node A 702 is shown transmitting a plurality of object methods to different remote nodes. For example, object methods $750_1$-$750_2$ may be transmitted to remote node B 704 (see arrow $712_1$), object methods $750_3$-$750_4$ may be transmitted to remote node C (see arrow $712_2$), and object method $750_n$ may be transmitted to remote node C (see arrow $712_n$). Accordingly, remote nodes B, C, and N, are shown with object methods $750_1$-$750_2$, $750_3$-$750_4$, and $750_n$, respectively.

Once the object methods are received, the remote nodes B, C, N may compile the object methods to native instructions using a just-in-time compiler. Accordingly, remote node B is shown compiling object methods $750_1$-$750_2$ to native instructions $750'_1$-$750'_2$ (see arrow $714_1$), remote node C is shown compiling object methods $750_3$-$750_4$ to native instructions $750'_3$-$750'_4$ (see arrow $714_2$), and remote node N is shown compiling object method $750_n$ to native instructions $750'_n$ (see arrow $714_n$).

After compilation is complete, remote nodes B, C, N may subsequently transmit the native instructions generated by the compilation process to the local node (illustrated as local node A' 710. Accordingly, native instructions $750'_1$-$750'_2$ may be migrated from remote node B 704 to local node A' 710 (see arrow $716_1$), native instructions $750'_3$-$750'_4$ may be migrated from remote node C to local node A' 710 (see arrow $716_2$), and native instructions $750'_n$ may be migrated from remote node C to local node A' 710 (see arrow $716_n$). Additionally, local node A' 710 is shown with native instructions $750'_1$-$750'_n$. Thus, the local node may then execute the native instructions locally.

While the foregoing is directed to embodiments of the present invention, other and further embodiments of the invention may be devised without departing from the basic scope thereof, and the scope thereof is determined by the claims that follow.

What is claimed is:

1. A computer-implemented method for optimizing a program executing on plurality of compute nodes of a massively parallel computing system, comprising:
    identifying a plurality of blocks of code included in the program;
    selecting, for at least a first block of code, a plurality of sets of optimization parameters to use in compiling the first block of code into a set of native instructions;
    transmitting one of the sets of optimization parameters to each of the plurality of compute nodes, wherein each compute node includes a processor and a memory, and wherein the plurality of compute nodes are connected via at least one data network;
    compiling, by each of the plurality of compute nodes, the first block of code using the set of optimization parameters received by a respective compute node;
    monitoring, by a service node, at least a performance characteristic of the program when the set of native instructions generated by compiling the first block of code according to the set of optimization parameters are executed by one of the compute nodes;
    transmitting, by the service node, to at least a first compute node of the plurality of compute nodes, an indication to recompile the first block of code using a selected one of the sets of optimization parameters selected by evaluating the monitored performance characteristic; and
    recompiling, by the first compute node, the selected block of code using the selected set of optimization parameters.

2. The method of claim 1, wherein the performance characteristics indicate an execution time of the native instructions, relative to the execution time of the block of code.

3. The method of claim 1, wherein the service node is one of the plurality of compute nodes.

4. The method of claim 1, wherein the block of code comprises bytecode executable by a virtual machine running on each respective compute node, of the plurality of compute nodes.

5. The method of claim 1, wherein the block of code encapsulates at least one of a method, an object, a class, and a package.

6. A computer-readable storage medium containing a program which, when executed by a processor, performs an operation for optimizing an application program executing on plurality of compute nodes of a massively parallel computing system, comprising:
- identifying a plurality of blocks of code included in the program;
- selecting, for at least a first block of code, a plurality of sets of optimization parameters to use in compiling the first block of code into a set of native instructions;
- transmitting one of the sets of optimization parameters to each of the plurality of compute nodes, wherein each compute node includes a processor and a memory, and wherein the plurality of compute nodes are connected via at least one data network;
- compiling, by each of the plurality of compute nodes, the first block of code using the set of optimization parameters received by a respective compute node;
- monitoring, by a service node, at least a performance characteristic of the program when the set of native instructions generated by compiling the block of code according to the set of optimization parameters are executed by one of the compute nodes;
- transmitting, by the service node, to at least a first compute node of the plurality of compute nodes, an indication to recompile the first block of code using a selected one of the sets of optimization parameters selected by evaluating the monitored performance characteristic; and
- recompiling, by the first compute node, the selected block of code using the selected set of optimization parameters.

7. The computer-readable storage medium of claim 6, wherein the performance characteristics indicate an execution time of the native instructions, relative to the execution time of the block of code.

8. The computer-readable storage medium of claim 6, wherein the service node is one of the plurality of compute nodes.

9. The computer-readable storage medium of claim 6, wherein the block of code comprises bytecode executable by a virtual machine running on each respective compute node, of the plurality of compute nodes.

10. The computer-readable storage medium of claim 6, wherein the block of code encapsulates at least one of a method, an object, a class, and a package.

11. A system, comprising:
- a plurality of compute nodes, each having a processor and a memory, and each executing an application program;
- a service node having a processor and a memory, and executing program, which when executed on the service node performs an operation for optimizing the application program executing on the plurality of compute nodes, the operation comprising:
- identifying a plurality of blocks of code included in the program,
- selecting, for at least a first block of code, a plurality of sets of optimization parameters to use in compiling the first block of code into a set of native instructions,
- transmitting one of the sets of optimization parameters to each of the plurality of compute nodes, wherein each compute node includes a processor and a memory, wherein the plurality of compute nodes are connected via at least one data network,
- compiling, by each of the plurality of compute nodes, the first block of code using the set of optimization parameters received by a respective compute node,
- monitoring at least a performance characteristic of the program when the set of native instructions generated by compiling the block of code according to the set of optimization parameters are executed by one of the compute nodes,
- transmitting to at least a first compute node of the plurality of compute nodes, an indication to recompile the first block of code using a selected one of the sets of optimization parameters selected by evaluating the monitored performance characteristic, and
- recompiling, by the first compute node, the selected block of code using the selected set of optimization parameters.

12. The system of claim 11, wherein the performance characteristics indicate an execution time of the native instructions, relative to the execution time of the block of code.

13. The system of claim 11, wherein the service node is one of the plurality of compute nodes.

14. The system of claim 11, wherein the block of code comprises bytecode executable by a virtual machine running on each respective compute node, of the plurality of compute nodes.

15. The system of claim 11, wherein the block of code encapsulates at least one of a method, an object, a class, and a package.

* * * * *